US007657805B2

(12) United States Patent
Ziaja et al.

(10) Patent No.: US 7,657,805 B2
(45) Date of Patent: Feb. 2, 2010

(54) INTEGRATED CIRCUIT WITH BLOCKING PIN TO COORDINATE ENTRY INTO TEST MODE

(75) Inventors: Thomas Alan Ziaja, Austin, TX (US); Kevin D. Woodling, Austin, TX (US); Robert F. Molyneaux, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 266 days.

(21) Appl. No.: 11/772,328

(22) Filed: Jul. 2, 2007

(65) Prior Publication Data

US 2009/0013224 A1     Jan. 8, 2009

(51) Int. Cl.
*G01R 31/28* (2006.01)
(52) U.S. Cl. ...................................... 714/724
(58) Field of Classification Search ................. 714/724, 714/726
See application file for complete search history.

(56) References Cited

U.S. PATENT DOCUMENTS

| 5,805,609 | A  | * | 9/1998  | Mote, Jr. ..................... 714/726 |
| 5,991,910 | A  | * | 11/1999 | Hull et al. ................... 714/733 |
| 6,173,428 | B1 |   | 1/2001  | West |
| 6,418,545 | B1 |   | 7/2002  | Adusumilli |
| 6,425,100 | B1 | * | 7/2002  | Bhattacharya ............... 714/724 |
| 6,829,730 | B2 |   | 12/2004 | Nadeau-Dostie |
| 6,918,057 | B1 |   | 7/2005  | Brophy et al. |
| 7,073,111 | B2 |   | 7/2006  | Whetsel |
| 7,274,203 | B2 | * | 9/2007  | Tumin et al. ................ 324/765 |
| 7,281,182 | B2 | * | 10/2007 | Gillis et al. ................. 714/726 |
| 7,380,185 | B2 | * | 5/2008  | Doorenbos et al. .......... 714/726 |
| 2006/0149958 | A1 |   | 7/2006  | Omathuna |
| 2006/0236174 | A1 |   | 10/2006 | Whetsel |
| 2007/0011525 | A1 | * | 1/2007  | Suzuki ....................... 714/726 |
| 2007/0124637 | A1 |   | 5/2007  | Goldrain et al. |
| 2007/0126429 | A1 |   | 6/2007  | Tanaka |
| 2007/0126456 | A1 |   | 6/2007  | Toh et al. |
| 2007/0143652 | A1 |   | 6/2007  | Baba |
| 2007/0150782 | A1 |   | 6/2007  | Moyer et al. |

OTHER PUBLICATIONS

"IEEE Std 1149.1 (JTAG) Testability Primer," Texas Instruments, 1997, 146 pages.
Tom Waayers, "An Improved Test Control Architecture and Test Control Expansion For Core-Based System Chips," ITC International Test Conference, IEEE, 2003, 10 pages.

* cited by examiner

*Primary Examiner*—James C Kerveros
(74) *Attorney, Agent, or Firm*—Robert C Kowert; Anthony M. Petro; Meyertons, Hood, Kivlin, Kowert & Goetzel, P.C.

(57) ABSTRACT

An integrated circuit (IC) including a blocking pin. An IC may include state logic, a test control unit configured to coordinate access by external circuitry to operating state of the state logic during a test mode, and interface pins configured to couple the integrated circuit to the external circuitry. Shared interface pins may provide input signals to the test control unit during the test mode of operation and may perform distinct I/O functions during normal mode operation. A blocking interface pin, when asserted by external circuitry during normal mode operation, may force test signals derived from at least a portion of the shared interface pins by the test control unit into respective quiescent states, such that subsequent to assertion of the blocking pin, the integrated circuit is operable to enter the test mode of operation from the normal mode of operation without resetting operating state of the state logic.

20 Claims, 8 Drawing Sheets

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | | | | | | | | |

*FIG. 3*

INTEGRATED CIRCUIT WITH BLOCKING PIN TO COORDINATE ENTRY INTO TEST MODE

BACKGROUND OF THE INVENTION

1. Field of the Invention

This invention relates to integrated circuits, and more particularly, to techniques for testing integrated circuits.

2. Description of the Related Art

Integrated circuits, which may include microprocessors and other digital logic devices as well as analog and mixed-signal devices, may generally include a significant number of semiconductor components manufactured through complex fabrication processes. As manufacturing geometries shrink, complex designs including hundreds of millions of interconnected transistor devices become feasible. However, advances in integrated circuit density and design and manufacturing complexity significantly increase the challenge of ensuring that the resulting device is functional, reliable and capable of operating within expected performance and environmental parameters.

For example, as microprocessor implementations become increasingly sophisticated, it may become more difficult to functionally verify the design, as increased functional complexity may lead to a greater number of possibilities for error in implementation. Likewise, as device geometries shrink, opportunities for manufacturing defects increase due to manufacturing environment impurities, process inconsistency, and other factors.

Integrated circuits are often tested during the manufacturing process through the use of a test environment including sophisticated and expensive automated test equipment. Such test equipment typically interfaces with the integrated circuit using the electrical connections, commonly referred to as pins, provided by the integrated circuit's package. Owing to limitations on package sizes and increasingly complex integrated circuit input/output requirements, interface pins are often scarce resources, rendering it impractical to reserve large numbers of interface pins solely for dedicated testing purposes. Additionally, as integrated circuits become increasingly complex in design, it may become difficult to efficiently and reliably initiate integrated circuit testing without causing undesired operational side effects or increasing the burden of pre-manufacturing design verification.

SUMMARY

An integrated circuit including a blocking pin configured to coordinate operation of shared integrated circuit pins during a transition from normal mode operation to test mode operation is disclosed. In one embodiment, an integrated circuit may include state logic configured to store integrated circuit operating state, a test control unit configured to coordinate access by external circuitry to operating state of the state logic during a test mode of operation of the integrated circuit, and interface pins configured to couple the integrated circuit to the external circuitry, where members of a subset of the interface pins are configured as shared interface pins.

Each of the shared interface pins may be operable to provide a respective input signal to the test control unit during the test mode of operation, and may be further operable, during a normal mode of operation of the integrated circuit, to perform a respective integrated circuit input/output (I/O) function distinct from its function during the test mode of operation. The interface pins may include a blocking pin that, when asserted by the external circuitry during the normal mode of operation, is configured to force test signals derived from at least a portion of the shared interface pins by the test control unit into respective quiescent states, such that subsequent to assertion of the blocking pin, the integrated circuit is operable to enter the test mode of operation from the normal mode of operation without resetting operating state of the state logic.

BRIEF DESCRIPTION OF THE DRAWINGS

Other aspects of the invention will become apparent upon reading the following detailed description and upon reference to the accompanying drawings in which:

FIG. 3 is a pipeline diagram illustrating the flow of instructions through one embodiment of a processor core.

Figure 1:
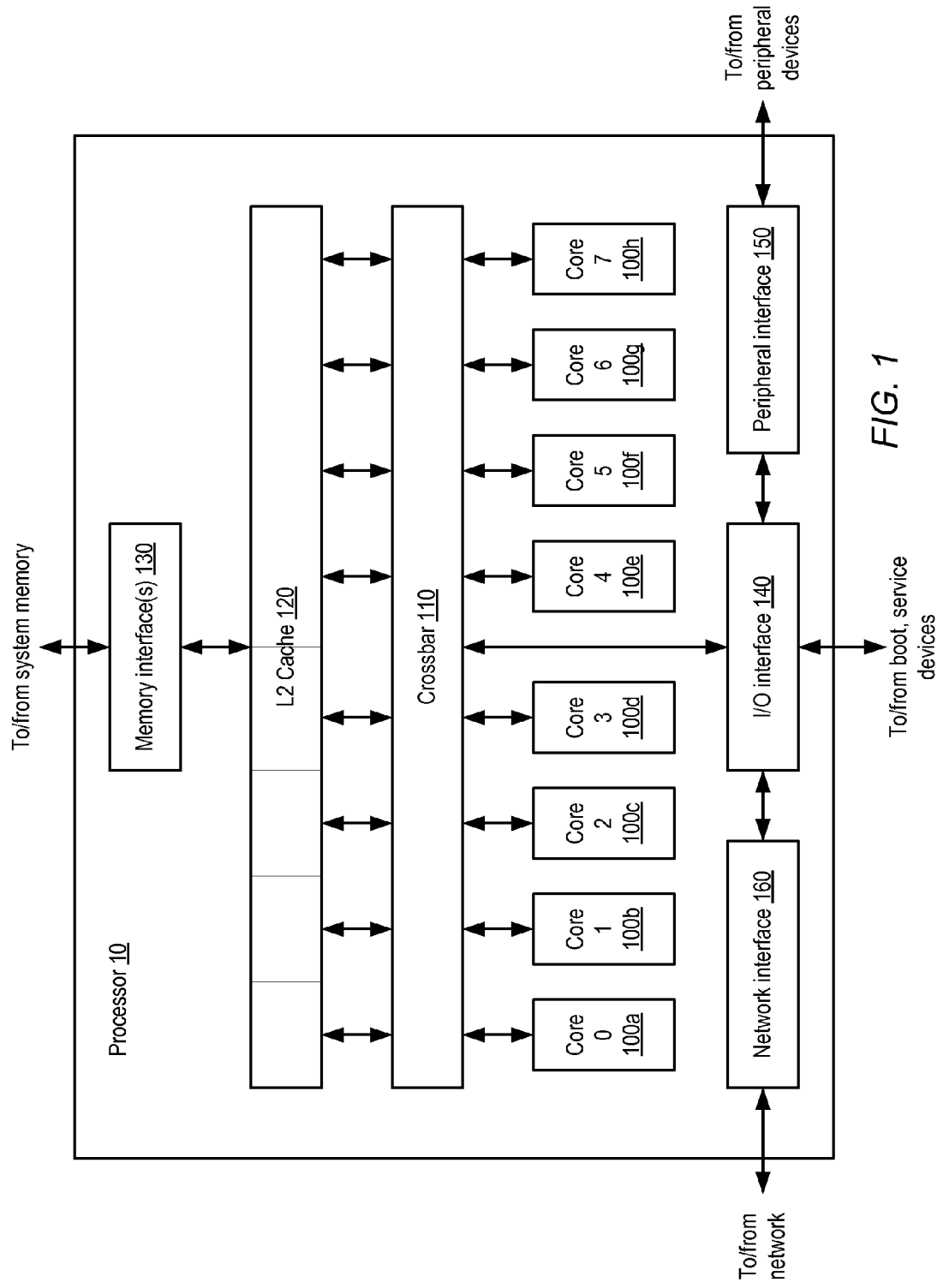
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

Introduction

As mentioned above, increasingly complex integrated circuit (IC) designs create challenges for implementing effective and reliable manufacturing test strategies. In the following discussion, one example of a complex integrated circuit implementing a multiple core, multithreaded processor is described in detail. Subsequently, particular techniques for implementing certain test features on such a complex circuit are discussed. It is noted, however, that the description of the multithreaded processor is merely exemplary, and that the test techniques described below may be implemented in any suitable type of IC, regardless of whether the circuit implements a general-purpose microprocessor, an embedded processor, custom functionality (e.g., an application-specific integrated circuit or ASIC), or any other functionality that may be realized by an IC.

Overview of Multithreaded Processor Architecture

A block diagram illustrating one embodiment of a multithreaded processor 10 is shown in FIG. 1. In the illustrated embodiment, processor 10 includes a plurality of processor cores 100a-h, which are also designated "core 0" through "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network. In some embodiments, the elements included in processor 10 may be fabricated as part of a single integrated circuit (IC), for example on a single semiconductor die.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
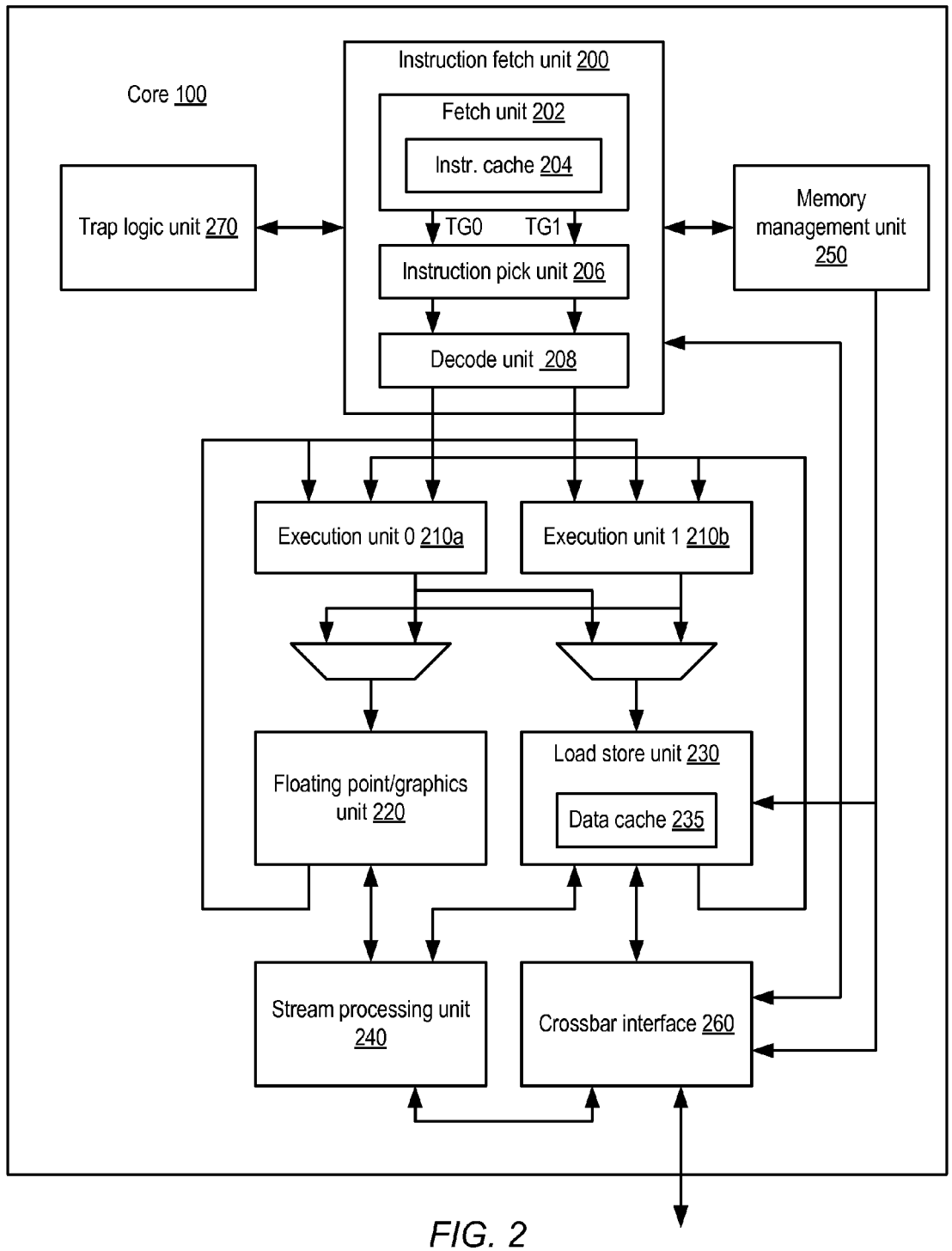
FIG. 2 is a block diagram illustrating one embodiment of a processor core.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210*a-b*. (Execution units 210*a-b* may also be referred to generically as EXUs 210.) Each of execution units 210*a-b* is coupled to both a floating point/graphics unit (FGU) 220 and a load store unit (LSU) 230. Each of the latter units is also coupled to send data back to each of execution units 210*a-b*. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 204 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction issue or execution. For example, in one embodiment SPU 240 may be configured to receive operations and operands via control registers accessible via software; in the illustrated embodiment SPU 240 may access such control registers via LSU 230. In such embodiments, SPU 240 may be indirectly programmed or configured by instructions issued from IFU 200, such as instructions to read or write control registers. However, even if indirectly programmed by such instructions, SPU 240 may execute independently without further interlock or coordination with IFU 200. In another embodiment SPU 240 may receive operations (e.g., instructions) and operands decoded and issued from the instruction stream by IFU 200, and may execute in response to such operations. That is, in such an embodiment SPU 240 may be configured as an additional functional unit schedulable from the instruction stream, rather than as an independent coprocessor.

In some embodiments, SPU 240 may be configured to freely schedule operations across its various algorithmic subunits independent of other functional unit activity. Additionally, SPU 240 may be configured to generate memory load and store activity, for example to system memory 810 described below. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has results that are ready to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Integrated Circuit Testing

As shown in FIGS. 1 and 2, processor 10 and cores 100 may include a substantial number of circuit elements. For example, in some embodiments processor 10 may include hundreds of millions of transistor devices interconnected as combinatorial logic gates, storage arrays, state elements such as registers or flip-flops and other types of circuits. These devices may be manufactured on a substrate, such as silicon or another suitable substrate, using typical lithographic semiconductor manufacturing processes. The resulting circuit may be referred to as a monolithic integrated circuit or monolithic IC. For example, numerous instances of the circuitry corresponding to processor 10 may be manufactured on a single wafer, which may then be divided into individual monolithic ICs.

Owing to the sheer number of devices that may be included within a given monolithic IC, such as an IC implementing processor 10, as well as the complexity of the circuits that may include them, numerous opportunities exist for failures that may arise during the manufacturing or operation of such circuits. For example, manufacturing flaws may cause a device or interconnect to be permanently nonfunctional (e.g., circuit nodes may be permanently "stuck at" a logic 0 or 1 value due to open or short circuits), which may result in circuit malfunction and possibly a malfunction of a core 100 or processor 10 in its entirety. Additionally, variations in manufacturing processes as well as specific design characteristics may result in transient failures that arise from circuit operating conditions. For example, certain circuits within a monolithic IC such as processor 10 may exhibit timing-sensitive behavior, such that they may malfunction if clocked at a rate that is too fast or too slow. Other circuits may exhibit sensitivity to operating conditions such as temperature, circuit voltage, noise, or other factors that may impact correct circuit operation.

In many embodiments, a monolithic IC may include an interface configured to allow automated test equipment (ATE) external to the monolithic IC to access and manipulate circuit structures for testing purposes. For example, after manufacture, a monolithic IC may be directly or indirectly coupled to an ATE tester that may be configured to run a series of tests to ascertain whether the IC is functional and/or to grade its performance (e.g., to categorize the circuit into one of several frequency bins according to the maximum clock frequency at which the circuit reliably operates). Such tests may involve exercising interface signals of the monolithic IC to provide an input test stimulus (e.g., a test data pattern) to the IC and to retrieve data indicative of the monolithic IC's internal state. If retrieved state differs from the expected state, the ATE tester may indicate that the IC is faulty or limited in its performance under the conditions of the test.

A monolithic IC may typically provide a number of electrical interface connections through which it may couple to external circuitry. For example, a monolithic IC may provide connections through which it receives power from a power source as well as other connections through which it communicates with other circuitry, such as an ATE tester or a system in which the IC is implemented. In some embodiments, the interface connections may be physically distributed around the peripheral edges of the monolithic IC, while in other embodiments, the connections may be distributed across the planar surface(s) of the monolithic IC, for example as a rectilinear array.

In some embodiments, the monolithic IC's interface connections may be configured for connection to a package such as a pin grid array (PGA), ball grid array (BGA), quad flat pack (QFP) or another suitable type of package. Packages may typically be constructed of plastic, ceramic or other materials and typically provide electrically conductive leads (e.g., metal pins or wires, solder balls, etc.) through which the package may be electrically connected to other circuitry. When placed in a package, the monolithic IC interface connections may be wire-bonded or otherwise appropriately connected to connecting points within the package so as to provide electrically conductive paths from the package leads to the monolithic IC interface connections. In other embodiments, the monolithic IC interface connections may be configured to be directly connected (e.g., via wire bonding) to a substrate circuit, such as a printed circuit board, without using a package. When a monolithic IC is placed in a package, the entire assembly including monolithic IC and package may be referred to as a "packaged integrated circuit" or simply as an "integrated circuit."

Generally speaking, the term "interface pin" may be used herein to correspond to an interface connection physically located on a monolithic IC itself, or to an electrical connection on a package in which the monolithic IC is located and to which a corresponding monolithic IC interface connection is electrically coupled. That is, an interface pin may refer either to a feature of a package including a monolithic IC or to a feature of a monolithic IC itself, since monolithic ICs may be employed in either packaged or unpackaged applications. It is contemplated that in various embodiments, a monolithic IC may be tested via its interface pins either before or after packaging. Hereinafter, the term "integrated circuit" will be used generically, it being understood that the techniques and structures described may be applied to either packaged ICs or monolithic ICs.

In order to properly test an IC, it may be necessary for an ATE tester to provide various input signals to the IC that may not be required during a normal mode of IC operation. For example, during a normal mode of operation, an IC may be configured to internally generate its own clock signals for controlling synchronous logic. By contrast, depending on how the IC's test features are defined, when the IC is undergoing testing, it may be configured to receive such clock signals and/or other inputs from the external tester via its interface pins, which may allow the tester a greater degree of control over the conditions in which the IC is tested. For example, an external tester may be able to manipulate input signal characteristics such as timing (e.g., skew or jitter), voltage, noise level or other characteristics in order to evaluate the IC's response to non-ideal input conditions.

The input signals to an IC defined to have behavior that is specific to IC testing may be referred to generally as test input signals. Test input signals may generally include data and/or control signals as appropriate for the set of test features defined for the IC. In some instances, an IC may provide interface pins that are dedicated to test input signals and are unused during normal IC functional operation. However, many IC designs are physically limited in the number of interface pins they can provide. Given such constraints, it may be difficult to dedicate certain interface pins to test mode purposes while providing sufficient interface pins to meet the IC's requirements for power and input/output signaling during normal operation. Thus, in some embodiments, the function of certain IC interface pins may be shared such that during a test mode of IC operation, a shared pin may operate to interface test-related signals to the IC, while during a normal mode of operation, the shared pin may operate to interface signals having functions distinct from the test-related signals. Thus, a given shared pin may be operable during different modes of operation to interface different types of signals to the IC.

Although sharing interface pin functionality between test and other IC operating modes may enable better utilization of scarce pin resources, such sharing may complicate the implementation of certain types of test operations. One such scenario involves IC transition testing. A general overview of transition testing will first be given, followed by a discussion of the implications for interface pin sharing on such test techniques.

In order to ascertain the operating frequencies at which a manufactured IC may reliably perform, transition testing may be performed. Generally speaking, transition testing involves setting some portion of an IC (e.g., state elements at the input of a particular circuit path to be evaluated) to a predetermined state, operating the IC for one or more clock cycles, and then examining the state of the IC (e.g., at the output of the path under evaluation) to determine whether the actual state matches the expected state. By varying the rate at which the IC is clocked during transition testing, the frequency limits of various circuit paths may be identified (e.g., by increasing the frequency and repeating the test until state mismatches are detected).

However, transition testing typically requires the ability to clock the IC at frequencies in the range of its designed operating frequency. In many instances, given typical IC operating frequencies well in excess of 1 GHz, it is impractical or impossible for ATE test platforms to externally generate and drive such clocks to the IC under test while meeting the IC's internal timing constraints. Consequently, the transition testing features of a given IC may be designed such that the IC's own internal clocking resources (e.g., phase locked loops (PLLs), clock tree/grid, etc.) are used during transition testing. In complex IC designs, however, the process of initializing and stabilizing the IC's clocking resources may involve complex sequences of IC operation.

In some embodiments, in order to ensure stable and reliable operation at a high frequency, an IC may be designed to execute a complex sequence of resets during which the operating frequency is gradually increased to the designed operating frequency through one or more intermediate frequencies. This procedure may involve the interaction of numerous different portions of the IC over a significant number of operating cycles (e.g., on the order of thousands of cycles) and may involve the destruction of IC state, such that IC state visible at the beginning of the initialization procedure is no longer available following it. For example, if the ultimate operating frequency of the IC is 3.2 GHz, in one embodiment, after initial power-on reset is completed, a multi-stage initialization procedure may first stabilize the IC at 800 MHz and then 1.6 GHz prior to reaching 3.2 GHz, with various "soft" or "warm" resets partially resetting IC state at each transition.

Because of the complexity that may be entailed in stabilizing an IC at its designed operating frequency prior to beginning transition testing, it may be desirable to initialize the IC in its normal operating mode and execute the necessary procedures to stabilize its clocking resources. Once these tasks are complete, the IC may then be placed into a test mode of operation during which some of its behavior may be controlled by external circuitry, such as an ATE tester, while its clocking resources remain operational. Entering test mode from a normal mode of IC operation may present several design advantages. First, such a strategy may enable the operating state of the IC prior to entering test mode to be preserved, and thus observed via the external test environment once the IC is in test mode. By contrast, if the state-destructive initialization process is performed after entry into test mode rather than prior, some or all of the IC's operating state prior to entering test mode may be lost. This may reduce the flexibility or efficiency of testing operations. For example, if the IC state prior to entering test mode was of interest, it may have to be recreated in test mode via appropriate stimuli, if feasible.

Second, transitioning the IC from normal operating mode to test mode after initialization and without executing a subsequent reset procedure may reduce IC design verification complexity. For example, to ensure the functional correctness of the IC's behavior during initialization, it may be necessary to extensively test the design prior to manufacturing, such as through design simulation, emulation or other design modeling techniques. If the IC is designed to enter test mode from normal operating mode once initialization is complete, it may only be necessary to verify the correctness of the initialization behavior with respect to the normal operating mode. By contrast, if the IC were designed to enter test mode prior to completing the initialization process, it may be necessary to verify the initialization process twice: once with respect to normal operating mode, and once with respect to the functionally orthogonal test operating mode.

The use of shared interface pins that have distinct functionality in normal operating mode and test mode, as mentioned above, may be complicated in an IC design in which it is also desired to transition from normal operating mode to test mode after IC initialization is complete. By definition, the shared pins are operable to perform some particular function while the IC is in normal operating mode, and a distinct test-related function while the IC is in test mode. However, it may take some period of time for the external test environment, such as an ATE tester, to set up and drive the shared pins to their appropriate test mode values once the transition into test mode begins. During this time, it is possible for the shared pins to assume indeterminate states. For example, they may be undriven or may randomly fluctuate between asserted and deasserted states. If such indeterminate states are passed through to IC test mode logic or other circuits, they may disrupt the transition into test mode, for example by corrupting IC state. If the entry into test mode is predicated on IC initialization already having been completed in normal operating mode, corruption of IC state by indeterminate shared pin values may render it impossible to properly enter test mode without once again initializing the IC to guarantee its operating state.

Overview of Test Mode Logic Including Blocking Pin

Figure 4:
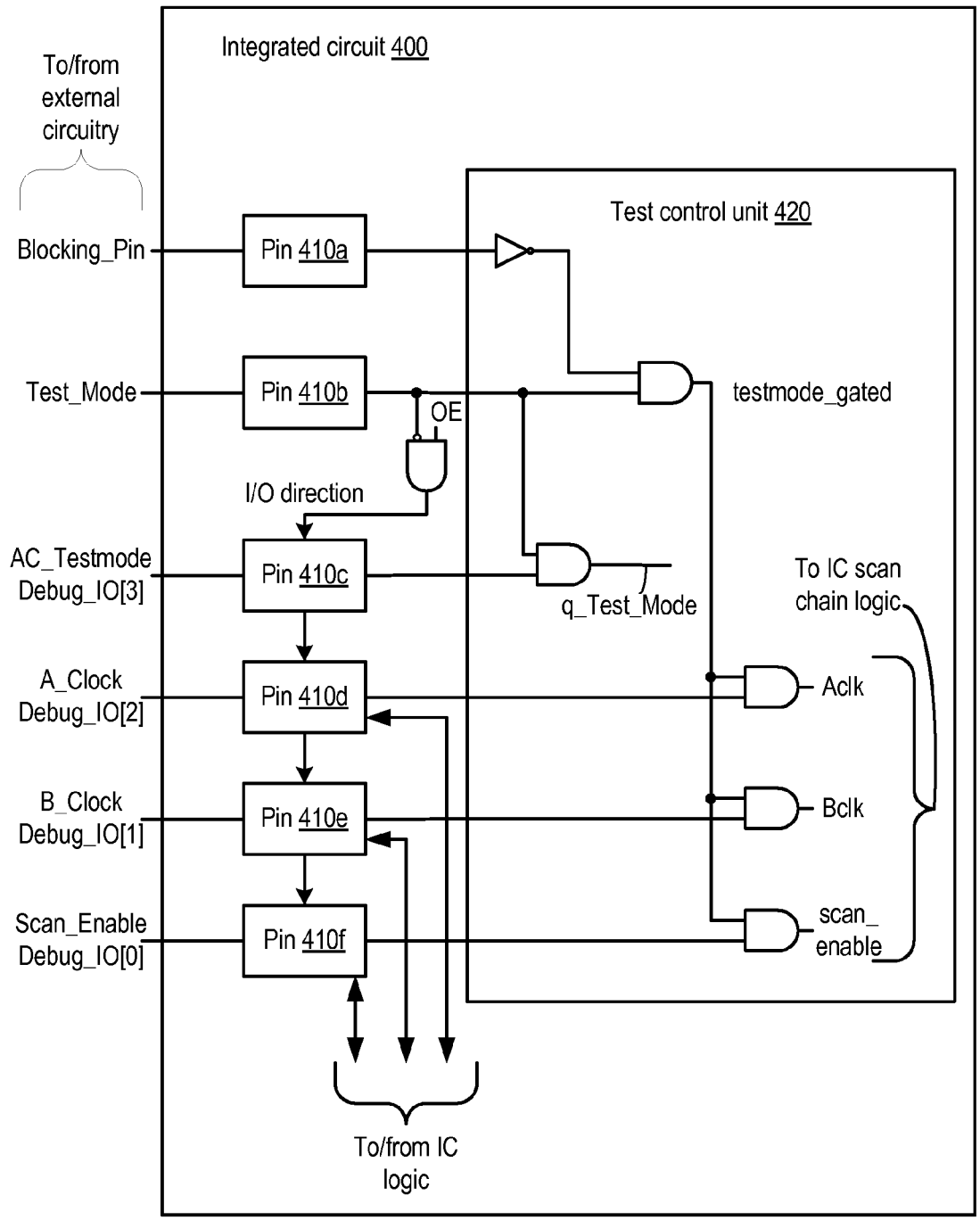
FIG. 4 is a block diagram of one embodiment of an integrated circuit including shared interface pins and a blocking pin.

FIG. 4 illustrates one embodiment of an integrated circuit that includes circuitry configured to prevent undriven shared interface pins from corrupting IC state while the IC is entering test mode. In the illustrated embodiment, IC 400 includes a plurality of interface pins 410*a-f* (which may be referred to collectively as interface pins 410, or simply pins 410), as well as a test control unit (TCU) 420 coupled to interface pins 410. It is noted that in one embodiment, IC 400 may include those features of processor 10 described above with respect to FIGS. 1 and 2 in addition to those features shown in FIG. 4, while in other embodiments, IC 400 may include other components or features. Also, various embodiments of IC 400 may have different numbers of pins 410 arranged in different configurations than that illustrated in FIG. 4.

In the illustrated embodiment, pins 410*c-f* may be configured as shared pins. During test mode operation of IC 400, these pins may be configured to provide external control of various test signals driven as inputs to TCU 420. Respectively, these signals include AC_Testmode, A_Clock, B_Clock and Scan_Enable, the function of which is described in greater detail below. During normal mode operation of IC 400, pins 410*c-f* may be configured to convey input/output (I/O) signals to and/or from IC 400, where the I/O signals perform functions distinct from the functions pins 410*c-f* perform during test mode. As shown, during normal mode operation pins 410*c-f* correspond to pins of a multiple-bit debug data bus denoted Debug_IO[3:0]. It is noted, however, that the functions of shared pins 410*c-f* as described herein are merely exemplary, and in other embodiments, shared pins 410*c-f* may be configured to perform other functions than those described above in either normal or test modes of operation.

As shown, pins 410*a-b* may be respectively configured as input pins to provide Blocking_Pin and Test_Mode signals to TCU 420. As described in greater detail below in conjunction with the descriptions of FIGS. 6-7, in one embodiment, interface pin 410*a* (also referred to as blocking pin 410*a*) may be asserted by external logic (e.g., an ATE tester) during normal mode operation of IC 400. In response, interface pin 410*a* may be configured to force various test signals derived from at least some of shared pins 410*c-f* by TCU 420 to respective quiescent states. As described below, this may allow IC 400 to transition from normal mode operation to test mode operation while preventing the effects of indeterminate states that may occur on shared pins 410*c-f* from disrupting the operating state of IC 400. While blocking pin 410*a* is shown in the illustrated embodiment as a dedicated interface pin, it is contemplated that in other embodiments, blocking pin 410*a* may be configured as a shared pin similar to shared pins 410*c-f*.

In the illustrated embodiment, shared pins 410*c-f* are shown as bidirectional pins. Generally speaking, a bidirectional interface pin may include active logic, such as tristate buffers or other suitable logic, configured to allow the pin to selectively function as either an input pin or an output pin of IC 400. As shown, the direction of data transfer of shared pins 410*c-f* is controlled by a function of the Test_Mode input pin and an Output Enable (OE) signal. The OE signal may be generated internally to IC 400 to allow other circuitry, such as processor 10, to control whether shared pins 410*c-f* operate as input or output pins during normal mode operation. During test mode operation, assertion of the Test_Mode input pin forces each of shared pins 410*c-f* to function as input pins. Thus, in the illustrated embodiment, shared pins 410*c-f* are configured to operate as unidirectional, input-only pins during test mode operation and as selectively bidirectional input/output pins during normal mode operation. However, in other embodiments, the directionality of shared pins 410*c-f* may be differently configured. For example, these pins may be configured as bidirectional pins during test mode, as unidirectional pins during normal mode, or in any other suitable fashion. In some embodiments, some of shared pins 410 may be configured as output-only pins during test mode.

Figure 5:
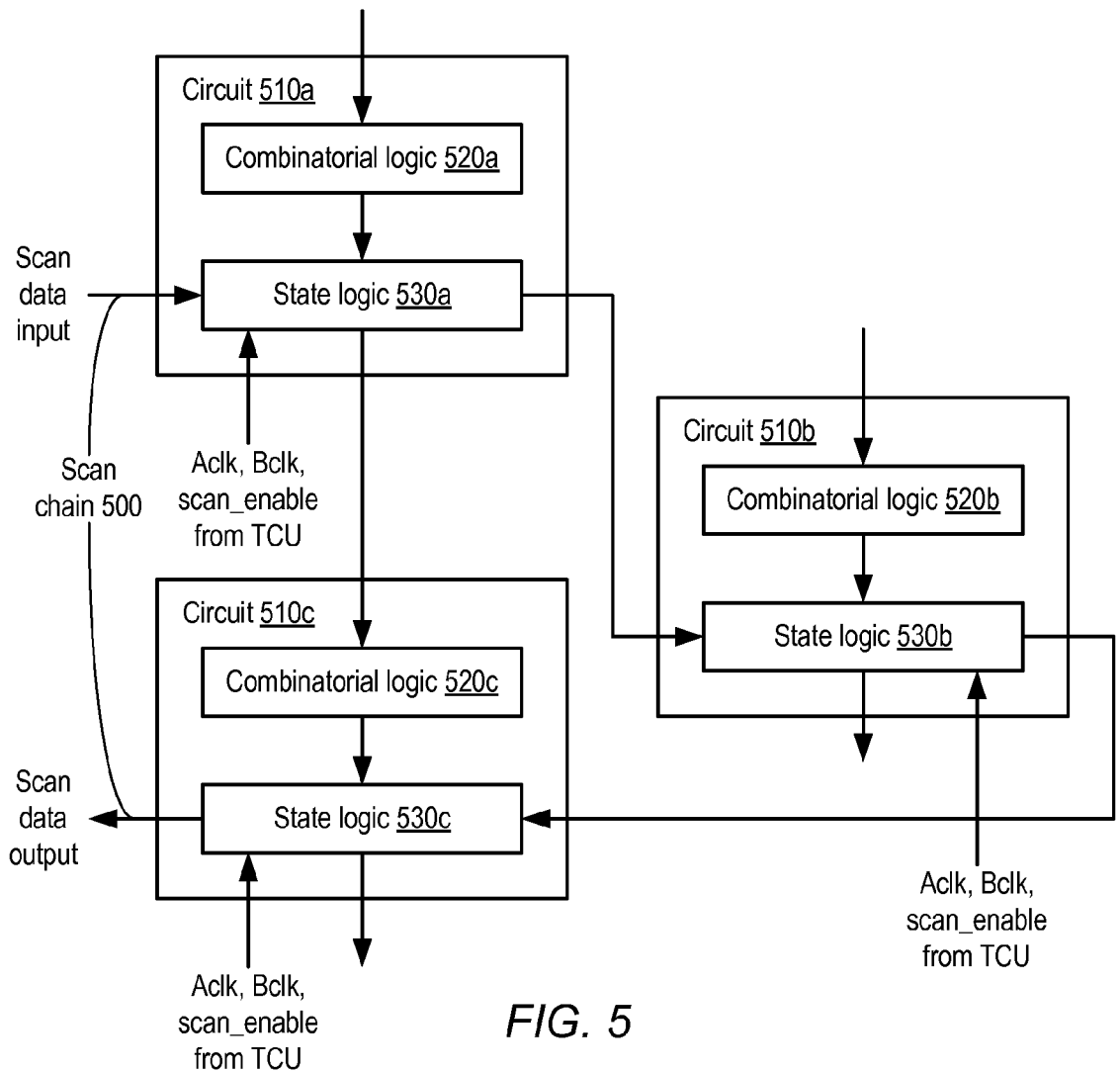
FIG. 5 is a block diagram illustrating one exemplary configuration of a scan chain.

Various circuits included within IC 400 may be accessible for testing via one or more scan chains that may be controlled by TCU 420 in order to permit access (e.g., by an external tester) to operating state of IC 400. For example, scan chains may be employed to provide tester visibility into various circuits included within processor 10, such as processor cores 100. One example configuration of a scan chain is illustrated in FIG. 5. In the illustrated embodiment, several distinct circuits 510a-c are shown. Each circuit 510 includes both combinatorial logic 520 and state logic 530. Generally speaking, combinatorial logic 520 may include logic gates or other structures that may not retain a logic output state once inputs to the combinatorial logic are removed or change in value. By contrast, state logic 530 may generally include registers, latches, flip-flops or other structures that may retain a logic output state even after input data is no longer present. It is noted that in some embodiments, circuits 510 may arrange combinatorial logic 520 and state logic 530 differently. For example, some circuits 510 may precede combinatorial elements with state elements, may use state elements both before and after combinatorial elements, or may implement multiple stages of alternating combinatorial and state elements. In other embodiments, such as certain dynamic logic families, all circuit elements may be considered state elements for the purpose of scanning as described below.

In the embodiment of FIG. 5, a scan chain 500 is shown interconnecting the state logic 530 of each of circuits 510. In some embodiments, scan chain 500 may be configured as a serial data path (e.g., a 1-bit wide data path), and each of state logic elements 530 may be configured as a shift register or an analogous element configured to shift its contents by, e.g., one bit position on each assertion of a scan clock signal. Input data may be provided to scan chain 500 at the chain input, denoted "scan data input" in FIG. 5. Similarly, output data may be read from scan chain 500 at the chain output, shown as "scan data output" in FIG. 5. In some embodiments, the scan data input and output of scan chain 500 may be accessible via one or more interface pins (not shown in FIG. 4) during test mode, such that external circuitry (e.g., an external ATE tester) may observe and/or modify the operating state of those portions of IC 400 covered by scan chain 500. It is contemplated that in some embodiments, scan chain 500 may be implemented and controlled according to the Joint Test Access Group (JTAG) boundary scan methodology promulgated as versions of Institute of Electrical and Electronics Engineers (IEEE) standard IEEE 1149, such as IEEE 1149.1 (1990, revised 1994, 2001), IEEE 1149.4 (1999), or IEEE 1149.6 (draft). In other embodiments, scan chain 500 may implement features that are only partially JTAG compliant, are compliant with other industry standards, or are wholly proprietary.

In the illustrated embodiment, state logic 530 may include level-sensitive master/slave state elements each controlled by a respective scan clock, denoted Aclk and Bclk, as well as an enable signal, denoted scan_enable, that may enable state logic 530 to respond to the scan clocks. These scan signals may be derived from corresponding interface pin signals by TCU 420 as shown in FIG. 4, such that during test mode operation, an external tester may be configured to control the shift behavior of scan chain 500 by appropriate manipulation of the A_Clock, B_Clock and Scan_Enable shared pins 410d-f. In another embodiment, it is contemplated that TCU 420 may be configured to derive the dual scan clock signals Aclk and Bclk from a single scan clock signal received from an external tester via one of interface pins 410. It is noted that in alternative embodiments, state logic 530 may be implemented using other synchronization techniques, such that only a single scan clock may be internally required to control its test mode scan behavior. For example, state logic 530 may be implemented using edge-sensitive rather than level-sensitive state elements.

It is noted that although the signal or signals configured to control the shift operation of a scan chain 500 during test mode may be referred to generically as scan clocks, such signals are entirely distinct from a master operating clock signal that may be employed to synchronize operation of state elements of IC 400. For example, a master clock signal may be generated by an oscillator, such as a PLL, and distributed throughout IC 400 in order to coordinate operation of IC 400 at its designed operating frequency. By contrast, scan clock signals may be generated and manipulated independently of an IC's master clock signal, for example by an external tester, in order to control the scan behavior of a scan chain 500 during test mode. While it is possible for a scan clock signal to operate at frequencies comparable to an IC's master clock, in some instances a scan clock signal may operate at a much lower frequency than the master clock (e.g., by an order of magnitude). For example, the capabilities of an external tester may limit the frequency at which the scan clock may be generated and driven to IC 400 via interface pins 410.

As a particular example of operation of scan chain 500, if the data storage widths of state logic 530a-c are 15 bits, 32 bits and 12 bits, respectively, a particular 32-bit data value may be loaded into state logic 530b by presenting the appropriate value in serial format to scan chain 500 and appropriately asserting the A and B scan clocks 47 times, resulting in the entire data value propagating through state logic 530a and into state logic 530b. Similarly, the value of state logic 530b may be read out by clocking scan chain 500 44 times and discarding the first 12 bits of data read (which correspond to data from state logic 530c). It is noted that in some embodiments, manipulation of a given scan chain 500 may occur without necessarily suspending the operation of circuits 510 included in the given scan chain 500. For example, state logic 530 may include a separate state element into which data may be inserted or captured for scanning. Such a separate element may be separately controlled from a state element used to interconnect two circuits 510. In such an embodiment, which may be referred to as a "shadow scan" technique, a value to be scanned may be captured into the separate state element and scanned without disrupting the data flow among circuits 510.

It is noted that in different embodiments, scan chains 500 may interconnect circuits 510 that otherwise may bear no functional relationship to one another. That is, circuits 510 belonging to different functional units of a core 100, different cores 100, or other disparate elements of processor 10 may be linked via a common scan chain 500. To the extent that state logic 530 is accessible via a scan chain 500 (that is, to the extent that state logic 530 is scannable), that logic may potentially be read or written under the control of TCU 420. In some embodiments, every instance of state logic 530 within an IC may be scannable, whereas in other embodiments only certain instances of state logic 530 may be scannable.

Blocking Pin Operation to Coordinate Entry into Test Mode

Figure 6:
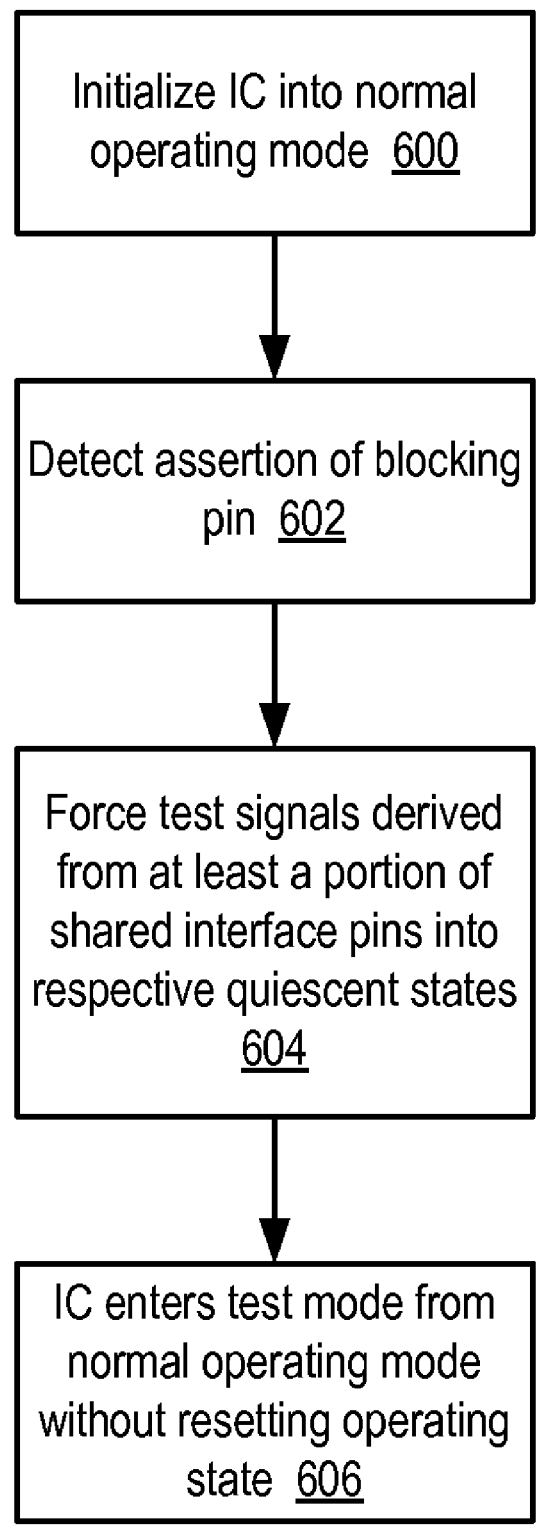
FIG. 6 is a flow diagram illustrating one embodiment of a method of coordinating entry into test mode from normal operating mode using a blocking pin.
Figure 7:
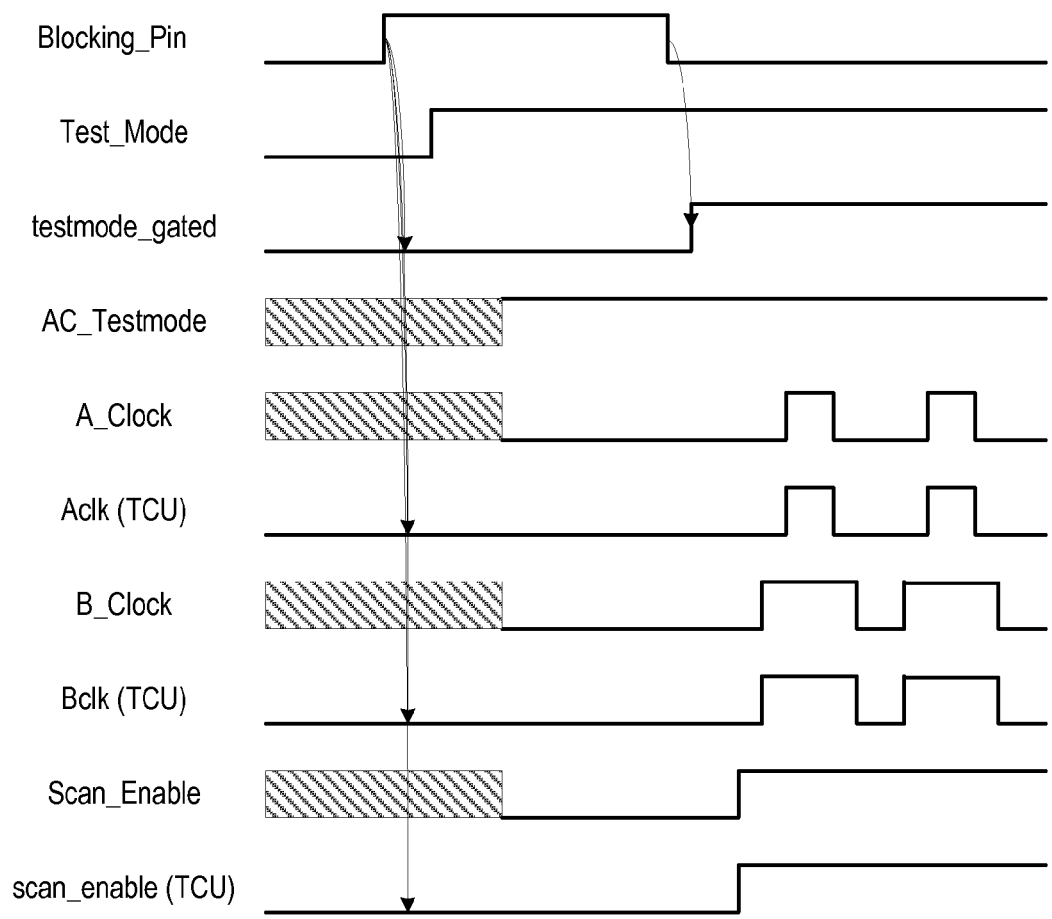
FIG. 7 is a timing diagram illustrating the behavior of one embodiment of a blocking pin and related signals during a transition from normal operating mode to test mode.

The flow chart shown in FIG. 6 and the timing diagram shown in FIG. 7 collectively illustrate one embodiment of operation of the test-related features of IC 400 shown in FIGS. 4-5. Operation begins in block 600 where IC 400 is initialized in normal operating mode. For example, IC 400 may be powered up and may undergo whatever reset initialization sequence is defined by its design. As a consequence of such initialization, IC 400 may be placed in a state in which its internal clock and power resources have stabilized to normal operating conditions and IC 400 is ready to begin normal functional operation. For example, where IC 400 is an embodiment of processor 10, following initialization IC 400 may be ready to fetch and execute instructions from an external memory.

Subsequent to IC 400 being initialized in normal operating mode, assertion of blocking pin 410a by external circuitry may be detected (block 602). For example, IC 400 may be coupled to an ATE tester that is configured to conduct various manufacturing tests. Once the tester determines that IC 400 has been initialized in normal operating mode (e.g., by observing the state of IC 400 via interface pins 410), the tester may be configured to place IC 400 in test mode by first asserting blocking pin 410*a*.

In response to being asserted, blocking pin 410*a* may be configured to force test signals derived from at least a portion of other shared pins 410 into respective quiescent states (block 604). For example, in the embodiment shown in FIG. 4, TCU 420 includes various logic gates coupled to blocking pin 410*a* and configured such that when blocking pin 410*a* is asserted, the signal testmode_gated is deasserted, regardless of the state of the Test_Mode input pin 410*b*. In turn, the testmode_gated signal is configured to qualify the A_Clock, B_Clock and Scan_Enable shared pins 410*d-f*, such that the TCU-derived Aclk, Bclk and scan_enable signals are forced into quiescent, deasserted states in response to the assertion of blocking pin 410*a*. Generally speaking, forcing a signal into a quiescent state may include holding that signal in an already-achieved quiescent state. (That is, forcing a signal into a quiescent state does not imply that the forced signal was necessarily in a previously different state.) For example, in some instances, one or more of the shared pins 410 may already be in a quiescent state prior to assertion of blocking pin 410*a*. In such instances, assertion of blocking pin 410*a* may force signals derived from the quiescent shared pin 410 to remain in a quiescent state, even if the quiescent shared pin 410 should subsequently change state while blocking pin 410*a* is asserted (e.g., due to glitching, noise, or other sources of unwanted transitions). It is noted that implementation shown in FIG. 4 merely shows the logical relationship between the various illustrated signals. The specific logic design through which blocking pin 410*a* may force test signals derived from shared pins 410 into quiescent states may vary in various embodiments. Any suitable implementation of the functional relationship between blocking pin 410*a* and the signals to be quiesced may be employed. Also, it is noted that while the various test signals have been shown to be quiesced to a deasserted state (e.g., a logical '0' state), in some embodiments the quiescent state of a given test signal may be defined to be a logically asserted state (e.g., a logical '1' state). Further, it is noted that in some embodiments, the logic through which blocking pin 410 may force test signals into quiescence need not be located within TCU 420, but may instead be located within any suitable functional unit(s) of IC 400, along with any other elements of TCU 420.

The forced quiescence of the test signals generated by TCU 420 in the embodiment of FIG. 4 is illustrated in the timing diagram of FIG. 7. As shown in the timing diagram, the assertion of blocking pin 410*a* forces the testmode_gated signal to a deasserted state, which in turn forces the Aclk, Bclk and scan_enable signals to deasserted states. As shown, the input signals on shared pins 410*c-f* are in an indeterminate state for a period of time even after the Test_Mode is asserted on interface pin 410*b*. However, owing to the assertion of blocking pin 410*a*, the test signals derived from shared pins 410*c-f* remain in respective quiescent states despite the indeterminate status of shared pins 410*c-f*.

Once blocking pin 410*a* has been asserted, IC 400 is operable to enter a test mode of operation without resetting its operating state (block 606). For example, in an embodiment where IC 400 implements processor 10, IC 400 may be configured to enter test mode without resetting the operating state of one or more of processor cores 100. In the embodiment shown in FIG. 4, Test_Mode input pin 410*b* may be asserted subsequent to assertion of blocking pin 410*a*. However, while blocking pin 410*a* remains asserted, those test signals that are qualified by blocking pin 410*a* remain quiescent. This may allow external logic (e.g., an ATE tester) to set up and properly drive shared pins 410*d-f* according to their test mode functionality, rather than their normal operating mode functionality, without risk that any indeterminate state that may occur on shared pins 410*c-f* during the transition will be passed through TCU 420. Once shared pins 410*d-f* are properly driven to known values, blocking pin 410*a* may be deasserted, enabling shared pins 410*d-f* to directly control the scan clock test signals. For example, as shown in FIG. 7, once blocking pin 410*a* is deasserted, the testmode_gated signal is asserted, which allows the test signals Aclk, Bclk and scan_enable to respond to their respective shared pins 410*d-f*. External circuitry may then employ shared pins 410*d-f* to manipulate the state of scan chains 500, as shown in FIG. 7.

It is noted that while the foregoing discussion specifically refers to examples involving the control of scan chains, in other embodiments, blocking pin 410*a* may be employed to qualify the generation of any test signal derived from a shared interface pin 410, regardless of the functional definition of the qualified test signal or the shared interface pin 410 from which it is derived. That is, blocking pin 410*a* may be employed to force the quiescence of any test signal derived from a shared interface pin 410 which, in the absence of such quiescence, may be subject to being driven to an indeterminate state by external circuitry during a transition of IC 400 from normal operating mode to test mode.

In addition to the features already discussed, in the embodiment shown in FIG. 4, TCU 420 includes additional logic configured to generate an internal version of the Test_Mode input signal that is not qualified by blocking pin 410*a*. In the illustrated embodiment, TCU 420 is configured to generate a q_Test_Mode signal that is the logical AND of Test_Mode input pin 410*b* and AC_Test_Mode shared interface pin 410*c*. Because the q_Test_Mode signal is not qualified by blocking pin 410*a* and is downstream from a shared pin, it may be subject to entering an indeterminate state until properly driven by external circuitry. However, q_Test_Mode may be used within IC 400 by circuits that do not pose a risk of corrupting IC operating state. Because q_Test_Mode is not qualified by blocking pin 410*a*, it may provide an early indication to other circuits within IC 400 that entry into test mode from normal operating mode is pending. In some embodiments, such circuits may use such an early indication to prepare for transition into test mode. For example, portions of IC 400 may use q_Test_Mode, once validly driven, to prevent IC 400 from commencing a lengthy operation, such as servicing of an interrupt or page fault, that it may not be able to complete prior to completion of the transition into test mode, or to perform other housekeeping tasks as may be appropriate given the characteristics of IC 400 and the definition of its test mode features. It is noted that a version of the Test_Mode signal that is not qualified by blocking pin 410*a*, such as q_Test_Mode, is optional and may be omitted in various embodiments. Also, in some embodiments, a version of the AC_Test_Mode signal that is qualified by blocking pin 410*a* may be employed in addition to a version, such as the q_Test_Mode signal, that is not so qualified.

Exemplary System Embodiment

Figure 8:
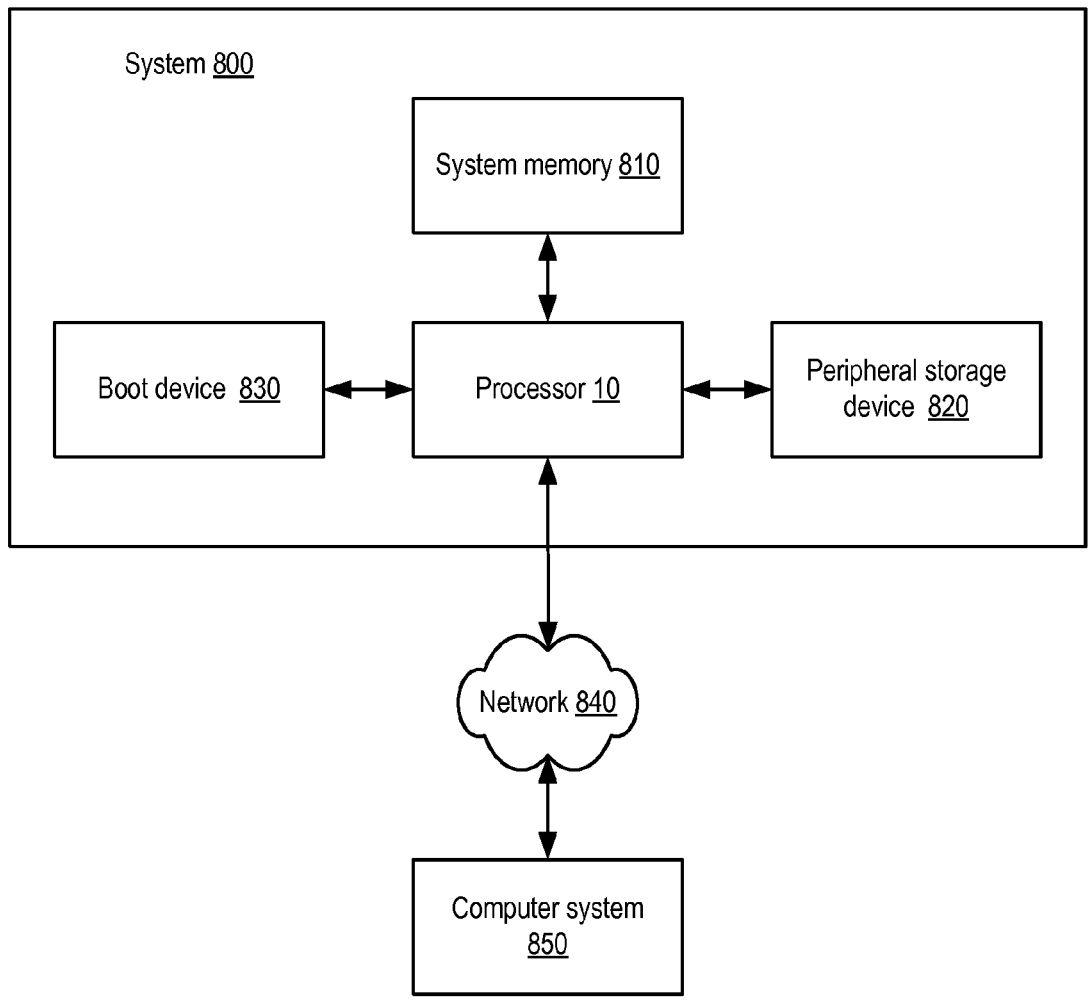
FIG. 8 is a block diagram illustrating one embodiment of a computer system.

As described above, in some embodiments processor 10 of FIG. 1 may be configured to interface with a number of external devices. One embodiment of a system incorporating an instance of IC 400 that implements processor 10 is illustrated in FIG. 8. In the illustrated embodiment, system 800 includes an instance of processor 10 coupled to a system memory 810, a peripheral storage device 820 and a boot device 830. Processor 10 may include the various interface pin features of IC 400 described above with respect to FIGS. 4-7. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

As noted previously, in various embodiments, system memory 810 may comprise any suitable type of system memory. Peripheral storage device 820 may be illustrative an I/O device that may be coupled to I/O interface 140 or peripheral interface 150 shown in FIG. 1, and in various embodiments may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. An integrated circuit, comprising:
    state logic configured to store operating state of said integrated circuit;
    a test control unit configured to coordinate access by external circuitry to operating state of said state logic during a test mode of operation of said integrated circuit;
    a plurality of interface pins configured to couple said integrated circuit to said external circuitry, wherein members of a subset of said interface pins are configured as shared interface pins;
    wherein each of said shared interface pins is operable to provide a respective input signal to said test control unit during said test mode of operation and is further operable, during a normal mode of operation of said integrated circuit, to perform a respective integrated circuit input/output (I/O) function distinct from its function during said test mode of operation;
    wherein said plurality of interface pins includes a blocking pin that, when asserted by said external circuitry during said normal mode of operation, is configured to force test signals derived from at least a portion of said shared interface pins by said test control unit into respective quiescent states, such that subsequent to assertion of said blocking pin, said integrated circuit is operable to enter said test mode of operation from said normal mode of operation without resetting operating state of said state logic.

2. The integrated circuit as recited in claim 1, wherein said state logic is included within a processor core configured to execute instructions, and wherein said integrated circuit is further operable to enter said test mode of operation from said normal mode of operation without resetting operating state of said processor core.

3. The integrated circuit as recited in claim 1, wherein said state logic is included within a plurality of processor cores, wherein each of said plurality of processor cores is configured to implement fine-grained multithreaded execution of instructions in which a given one of said processor cores is configured to execute a series of instructions corresponding respectively to a different ones of a plurality of threads in adjacent stages of an execution pipeline.

4. The integrated circuit as recited in claim 1, wherein said state logic is included within a scan chain.

5. The integrated circuit as recited in claim 4, wherein said test signals derived from said at least a portion of said shared interface pins by said test control unit include a scan clock signal and a scan enable signal.

6. The integrated circuit as recited in claim 4, wherein one or more of said shared pins are configured to control scan operation of said scan chain during said test mode of operation.

7. The integrated circuit as recited in claim 4, wherein access to said scan chain by said external circuitry is implemented by said integrated circuit in a manner compliant with Joint Test Access Group (JTAG) standard IEEE 1149.

8. The integrated circuit as recited in claim 1, wherein subsequent to entering said test mode of operation and in response to deassertion of said blocking pin, said test signals are operable to be controlled by said external circuitry via said at least a portion of said shared interface pins.

9. A method, comprising:
    asserting a blocking pin of an integrated circuit during a normal mode of operation of said integrated circuit, wherein said blocking pin is included within a plurality of interface pins of said integrated circuit, wherein said interface pins are configured to couple said integrated circuit to external circuitry, and wherein members of a subset of said interface pins are configured as shared interface pins;
    in response to assertion of said blocking pin, said integrated circuit forcing test signals derived from at least a portion of said shared interface pins into respective quiescent states;
    subsequent to assertion of said blocking pin, said integrated circuit entering a test mode of operation from said normal mode of operation without resetting operating state of state logic included within said integrated circuit;

wherein each of said shared interface pins is operable to provide a respective input signal to said test control unit during said test mode of operation and is further operable, during a normal mode of operation of said integrated circuit, to perform a respective integrated circuit input/output (I/O) function distinct from its function during said test mode of operation.

10. The method as recited in claim 9, wherein said state logic is included within a processor core configured to execute instructions, and wherein the method further comprises said integrated circuit entering said test mode of operation from said normal mode of operation without resetting operating state of said processor core.

11. The method as recited in claim 9, wherein said state logic is included within a plurality of processor cores, wherein each of said plurality of processor cores is configured to implement fine-grained multithreaded execution of instructions in which a given one of said processor cores is configured to execute a series of instructions corresponding respectively to a different ones of a plurality of threads in adjacent stages of an execution pipeline.

12. The method as recited in claim 9, wherein said state logic is included within a scan chain.

13. The method as recited in claim 12, wherein said test signals derived from said at least a portion of said shared interface pins by said test control unit include a scan clock signal and a scan enable signal.

14. The method as recited in claim 12, further comprising one or more of said shared pins controlling scan operation of said scan chain during said test mode of operation.

15. The method as recited in claim 12, wherein access to said scan chain by said external circuitry is implemented by said integrated circuit in a manner compliant with Joint Test Access Group (JTAG) standard IEEE 1149.

16. The method as recited in claim 9, further comprising:
subsequent to entering said test mode of operation and in response to deassertion of said blocking pin, said external circuitry controlling said test signals via said at least a portion of said shared interface pins.

17. A processor, comprising:
a plurality of processor cores each configured to execute instructions;
a test control unit configured to coordinate access by external circuitry to operating state of said processor cores during a test mode of operation of said processor;
a plurality of interface pins configured to couple said processor to said external circuitry, wherein members of a subset of said interface pins are configured as shared interface pins;
wherein each of said shared interface pins is operable to provide a respective input signal to said test control unit during said test mode of operation and is further operable, during a normal mode of operation of said processor, to perform a respective processor input/output (I/O) function distinct from its function during said test mode of operation;
wherein said plurality of interface pins includes a blocking pin that, when asserted by said external circuitry during said normal mode of operation, is configured to force test signals derived from at least a portion of said shared interface pins by said test control unit into respective quiescent states, such that subsequent to assertion of said blocking pin, said processor is operable to enter said test mode of operation from said normal mode of operation without resetting operating state of said processor cores.

18. A system, comprising:
a system memory; and
the processor as recited in claim 17 coupled to said system memory.

19. The processor as recited in claim 17, wherein said plurality of processor cores include a plurality of scan chains, and wherein to coordinate access by external circuitry to said operating state of said processor cores during said test mode of operation, said test control unit is further configured to exercise one or more of said scan chains.

20. The processor as recited in claim 17, wherein subsequent to entering said test mode of operation and in response to deassertion of said blocking pin, said test signals are operable to be controlled by said external circuitry via said at least a portion of said shared interface pins.

* * * * *